(12) United States Patent
Kawasaki

(10) Patent No.: US 11,364,747 B2
(45) Date of Patent: Jun. 21, 2022

(54) TIRE

(71) Applicant: Sumitomo Rubber Industries, Ltd., Hyogo (JP)

(72) Inventor: Yuzo Kawasaki, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 306 days.

(21) Appl. No.: 16/664,414

(22) Filed: Oct. 25, 2019

(65) Prior Publication Data

US 2020/0139767 A1    May 7, 2020

(30) Foreign Application Priority Data

Nov. 1, 2018  (JP) .............................. JP2018-206733

(51) Int. Cl.
*B60C 11/13* (2006.01)
*B60C 11/03* (2006.01)
*B60C 11/12* (2006.01)

(52) U.S. Cl.
CPC .......... *B60C 11/13* (2013.01); *B60C 11/1315* (2013.01); *B60C 11/1392* (2013.01);
(Continued)

(58) Field of Classification Search
CPC . B60C 11/1392; B60C 11/11; B60C 11/0304; B60C 11/0302; B60C 11/1323;
(Continued)

(56) References Cited

U.S. PATENT DOCUMENTS

2007/0000590 A1* 1/2007 Murata ................... B60C 11/13
                                                    152/209.8
2012/0067477 A1   3/2012 Berzins et al.
(Continued)

FOREIGN PATENT DOCUMENTS

EP    3 135 505 A1    3/2017
EP    3 388 256 A1    10/2018
(Continued)

OTHER PUBLICATIONS

JP 2017019437 Machine Translation, Sueyoshi, Yusuke (Year: 2017).*
(Continued)

*Primary Examiner* — Robert C Dye
*Assistant Examiner* — Nicholas J Weiler
(74) *Attorney, Agent, or Firm* — Studebaker & Brackett PC

(57) ABSTRACT

A tire that can improve braking performance on a dry road surface and wet performance is provided. The tire includes a tread portion 2. The tread portion 2 includes a shoulder land portion 5 disposed at an endmost tread edge side. The shoulder land portion 5 has a plurality of shoulder lateral grooves 10 that fully traverse the shoulder land portion 5. Each shoulder lateral groove 10 includes, in a transverse cross-section orthogonal to a longitudinal direction thereof, a bottom portion 11, a groove wall main body 12 extending from the bottom portion 11 outward in a tire radial direction, and a chamfered portion 15 between a ground-contact surface of the shoulder land portion 5 and the groove wall main body 12. The chamfered portion 15 is titled at an angle of 5 to 30° relative to a tread profile 13 obtained by extending the ground-contact surface.

19 Claims, 11 Drawing Sheets

(52) U.S. Cl.
CPC ..... *B60C 11/125* (2013.01); *B60C 2011/0365* (2013.01); *B60C 2011/0367* (2013.01); *B60C 2011/0374* (2013.01)

(58) Field of Classification Search
CPC ......... B60C 2011/0353; B60C 11/1376; B60C 11/1384; B60C 11/1315
See application file for complete search history.

(56) References Cited

U.S. PATENT DOCUMENTS

| | | | | |
|---|---|---|---|---|
| 2015/0343847 | A1* | 12/2015 | Niwa | B60C 11/0302 152/209.5 |
| 2016/0101655 | A1 | 4/2016 | Shibayama | |
| 2017/0313135 | A1* | 11/2017 | Ichimura | B60C 1/0008 |
| 2018/0079261 | A1* | 3/2018 | Kujime | B60C 11/1236 |
| 2019/0351714 | A1* | 11/2019 | Miyazaki | B60C 11/0304 |
| 2020/0338930 | A1* | 10/2020 | Buresh | B60C 11/0304 |

FOREIGN PATENT DOCUMENTS

| | | |
|---|---|---|
| JP | H02-141310 A | 5/1990 |
| JP | 2003-159911 A | 6/2003 |
| JP | 2017-019437 A | 1/2017 |
| JP | 2017-154710 A | 9/2017 |

OTHER PUBLICATIONS

The extended European search report issued by the European Patent Office dated Mar. 30, 2020, which corresponds to European Patent Application No. 19204491.5-1012 and is related to U.S. Appl. No. 16/664,414.

* cited by examiner

TIRE

BACKGROUND OF THE INVENTION

Field of the Invention

The present invention relates to a tire having shoulder lateral grooves on a tread portion.

Description of the Background Art

Japanese Laid-Open Patent Publication No. 2017-154710 proposes a tire having shoulder lateral grooves on shoulder land portions. The shoulder lateral grooves serve to enhance wet performance.

Generally, during braking on a dry road surface, the shoulder land portions of the tread portion of the tire receives large shearing force in the tire circumferential direction. Thus, the shoulder lateral grooves deform such that the groove widths thereof are reduced, so that there is a tendency that the ground-contact surface of the shoulder land portion connected to the edge of each of the grooves locally rises from the road surface. Therefore, the grip performance during braking on a dry road surface of the tire of Japanese Laid-Open Patent Publication No. 2017-154710 tends to deteriorate.

Meanwhile, when the opening area of each shoulder lateral groove is decreased in order to alleviate the above-described problem, there is a tendency that sufficient wet performance is not achieved.

SUMMARY OF THE INVENTION

The present invention has been made in view of the above-described problems, and a main object of the present invention is to provide a tire that can improve braking performance on a dry road surface and wet performance.

The present invention is directed to a tire including a tread portion, wherein the tread portion includes a shoulder land portion disposed at an endmost tread edge side, the shoulder land portion has a plurality of shoulder lateral grooves that fully traverse the shoulder land portion, each of the shoulder lateral grooves includes, in a transverse cross-section orthogonal to a longitudinal direction of the shoulder lateral groove, a bottom portion, a groove wall main body extending from the bottom portion outward in a tire radial direction, and a chamfered portion between a ground-contact surface of the shoulder land portion and the groove wall main body, and the chamfered portion is titled at an angle of 5 to 30° relative to a tread profile obtained by extending the ground-contact surface.

In the tire according to the present invention, preferably, the shoulder land portion includes a plurality of shoulder blocks demarcated by the plurality of shoulder lateral grooves, and each of the plurality of shoulder blocks has no groove and sipe on a tread surface thereof.

In the tire according to the present invention, preferably, each of the shoulder lateral grooves includes a first groove wall main body at one side in a tire circumferential direction, and a second groove wall main body at another side in the tire circumferential direction, the chamfered portion includes a first chamfered portion connected to the first groove wall main body, and a second chamfered portion connected to the second groove wall main body, and the first chamfered portion extends in a tire axial direction at a constant angle relative to the tread profile.

In the tire according to the present invention, the second chamfered portion preferably has a first portion and a second portion that have different angles relative to the tread profile.

In the tire according to the present invention, the angle of the second portion is preferably larger than the angle of the first portion.

In the tire according to the present invention, the second portion is preferably provided outward of the first portion in the tire axial direction.

In the tire according to the present invention, the angle of the first portion is preferably 15 to 25°.

In the tire according to the present invention, a groove edge at which the second chamfered portion of the shoulder lateral groove and the ground-contact surface are connected to each other preferably includes a bent portion having a Z shape.

In the tire according to the present invention, preferably, each of the shoulder lateral grooves has a pair of the groove wall main bodies that face each other, and, in a tread plan view, a maximum width of the chamfered portion is 0.50 to 1.70 times a maximum distance between the pair of the groove wall main bodies.

In the tire according to the present invention, preferably, the tread portion includes a middle land portion adjacent to an inner side in a tire axial direction of the shoulder land portion through a shoulder main groove, the middle land portion has a plurality of middle lateral grooves that extend from the shoulder main groove, and at least one of the middle lateral grooves is continuous with the shoulder lateral groove through the shoulder main groove.

In the tire according to the present invention, preferably, each of the middle lateral grooves includes, in a transverse cross-section orthogonal to a longitudinal direction of the middle lateral groove, a bottom portion, a groove wall main body extending from the bottom portion outward in the tire radial direction, and a chamfered portion between a ground-contact surface of the middle land portion and the groove wall main body, and the chamfered portion of each of the middle lateral grooves is tilted at an angle of 5 to 30° relative to a tread profile obtained by extending the ground-contact surface of the middle land portion.

In the tire according to the present invention, the angle of each of the middle lateral grooves is preferably smaller than the maximum angle of the shoulder lateral groove.

The shoulder land portion of the tire according to the present invention has a plurality of shoulder lateral grooves that fully traverse the shoulder land portion. Each shoulder lateral groove includes, in a transverse cross-section orthogonal to a longitudinal direction of the shoulder lateral groove, a bottom portion, a groove wall main body extending from the bottom portion outward in the tire radial direction, and a chamfered portion between a ground-contact surface of the shoulder land portion and the groove wall main body. The chamfered portion is tilted at an angle of 5 to 30° relative to a tread profile obtained by extending the ground-contact surface.

During braking on a dry road surface, such a shoulder lateral groove can prevent the ground-contact surface of the shoulder land portion from rising from the road surface, while a groove wall is moderately deforming to bring the outer surface of the chamfered portion into contact with the road surface, and further provides high grip performance. In addition, the chamfered portion can increase the opening area of the shoulder lateral groove to enhance wet performance.

As described above, the tire according to the present invention can improve braking performance on a dry road surface and wet performance.

DESCRIPTION OF THE PREFERRED EMBODIMENTS

Hereinafter, an embodiment of the present invention will be described with reference to the drawings.

Figure 1:
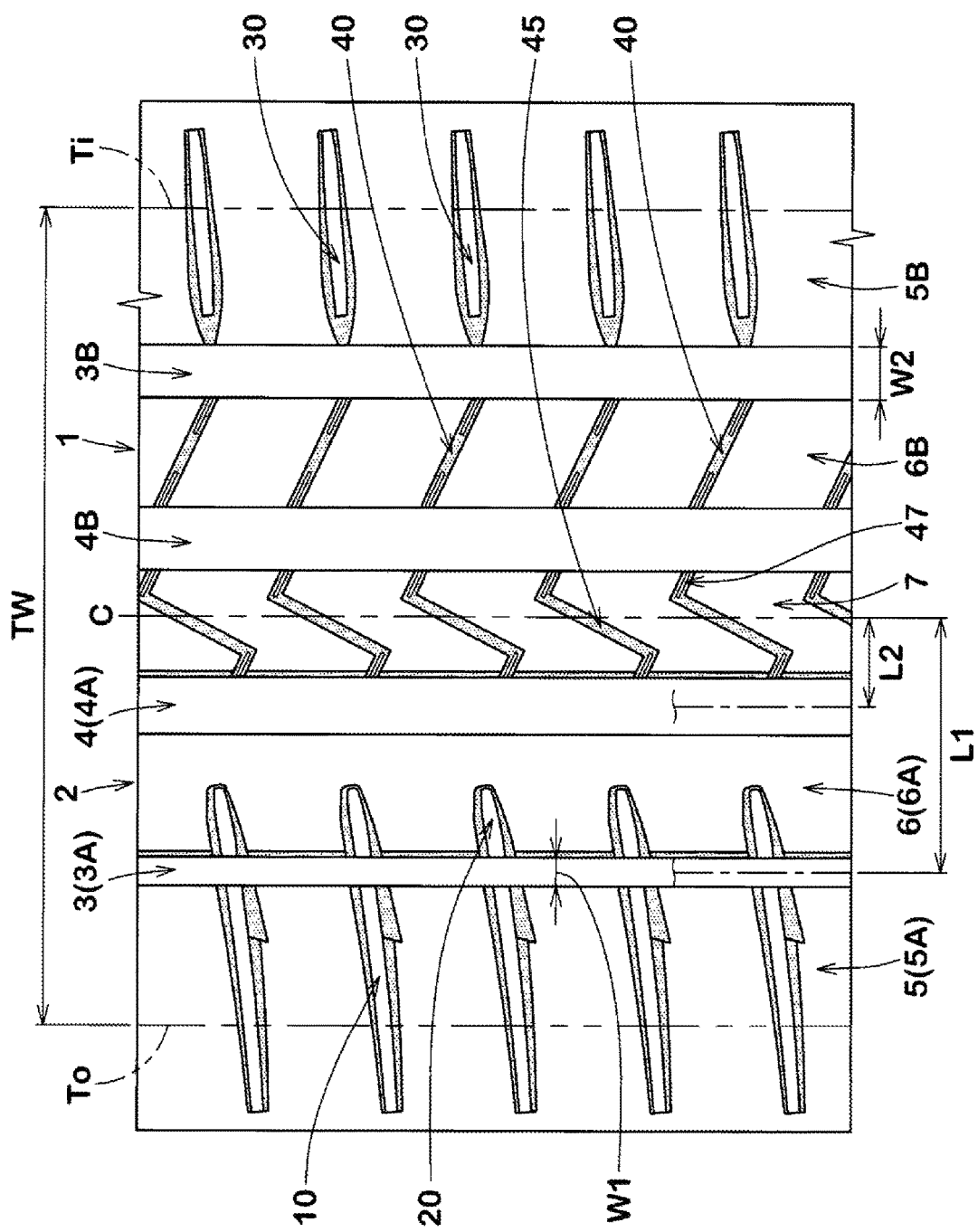
FIG. 1 is a development of a tread portion of a tire according to an embodiment of the present invention.

FIG. 1 is a development of a tread portion 2 of a tire 1 according to the present embodiment. The tire 1 according to the present embodiment is used, for example, as a pneumatic tire for a passenger car. However, the tire 1 according to the present invention is not limited to such an example.

The tire 1 according to the present embodiment has, for example, a tread pattern by which how the tire 1 is to be oriented when mounted to a vehicle is specified. How the tire 1 is to be oriented when mounted to a vehicle is indicated on a sidewall portion of the tire 1, for example, by characters or marks (not shown).

As shown in FIG. 1, the tread portion 2 has an outer tread edge To located at the outer side of a vehicle when the tire 1 is mounted on a vehicle, and an inner tread edge Ti located at the inner side of the vehicle when the tire 1 is mounted on the vehicle.

In the case of a pneumatic tire, each of the outer tread edge To and the inner tread edge Ti is a ground contact position at the outermost side in the tire axial direction when: a normal load is applied to the tire 1 in a normal state where the tire 1 is mounted to a normal rim and inflated to a normal internal pressure and no load is applied to the tire 1; and the tire 1 is brought into contact with a flat surface at a camber angle of 0 degrees. Unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

The tread portion 2 has a shoulder main groove 3 continuously extending in the tire circumferential direction at the outer tread edge To or inner tread edge Ti side, and a crown main groove 4 continuously extending in the tire circumferential direction at a tire equator C side. The shoulder main groove 3 includes an outer shoulder main groove 3A provided at the outer tread edge To side, and an inner shoulder main groove 3B provided at the inner tread edge Ti side. The crown main groove 4 includes an outer crown main groove 4A provided between the outer shoulder main groove 3A and the tire equator C, and an inner crown main groove 4B provided between the inner shoulder main groove 3B and the tire equator C. For example, each main groove of the present embodiment extends in a straight manner.

A distance L1 in the tire axial direction from the tire equator C to the groove center line of the shoulder main groove 3 is, for example, preferably 0.25 to 0.35 times a tread width TW. A distance L2 in the tire axial direction from the tire equator C to the groove center line of the crown main groove 4 is, for example, preferably 0.05 to 0.15 times the tread width TW. The tread width TW is the distance in the tire axial direction from the outer tread edge To to the inner tread edge Ti in the above normal state.

The groove width of each main groove is, for example, preferably 4.0% to 8.0% of the tread width TW. The groove depth of each main groove is, for example, preferably 5 to 12 mm.

The shoulder main groove 3 preferably has, for example, a smaller groove width than the crown main groove 4. In addition, a groove width W1 of the outer shoulder main groove 3A is preferably smaller than a groove width W2 of the inner shoulder main groove 3B. Specifically, the groove width W1 of the outer shoulder main groove 3A is preferably 0.50 to 0.80 times the groove width W2 of the inner shoulder main groove 3B.

The tread portion 2 has a plurality of land portions demarcated by the above main grooves. The tread portion 2 of the present embodiment has a shoulder land portion 5, a middle land portion 6, and a crown land portion 7.

The shoulder land portion 5 is disposed at the endmost tread edge side. The shoulder land portion 5 includes an outer shoulder land portion 5A disposed at the outer tread edge To side, and an inner shoulder land portion 5B disposed at the inner tread edge Ti side.

The middle land portion 6 includes, for example, an outer middle land portion 6A demarcated between the outer shoulder main groove 3A and the outer crown main groove 4A, and an inner middle land portion 6B demarcated between the inner shoulder main groove 3B and the inner crown main groove 4B.

The crown land portion 7 is, for example, demarcated between the outer crown main groove 4A and the inner crown main groove 4B.

Figure 2:
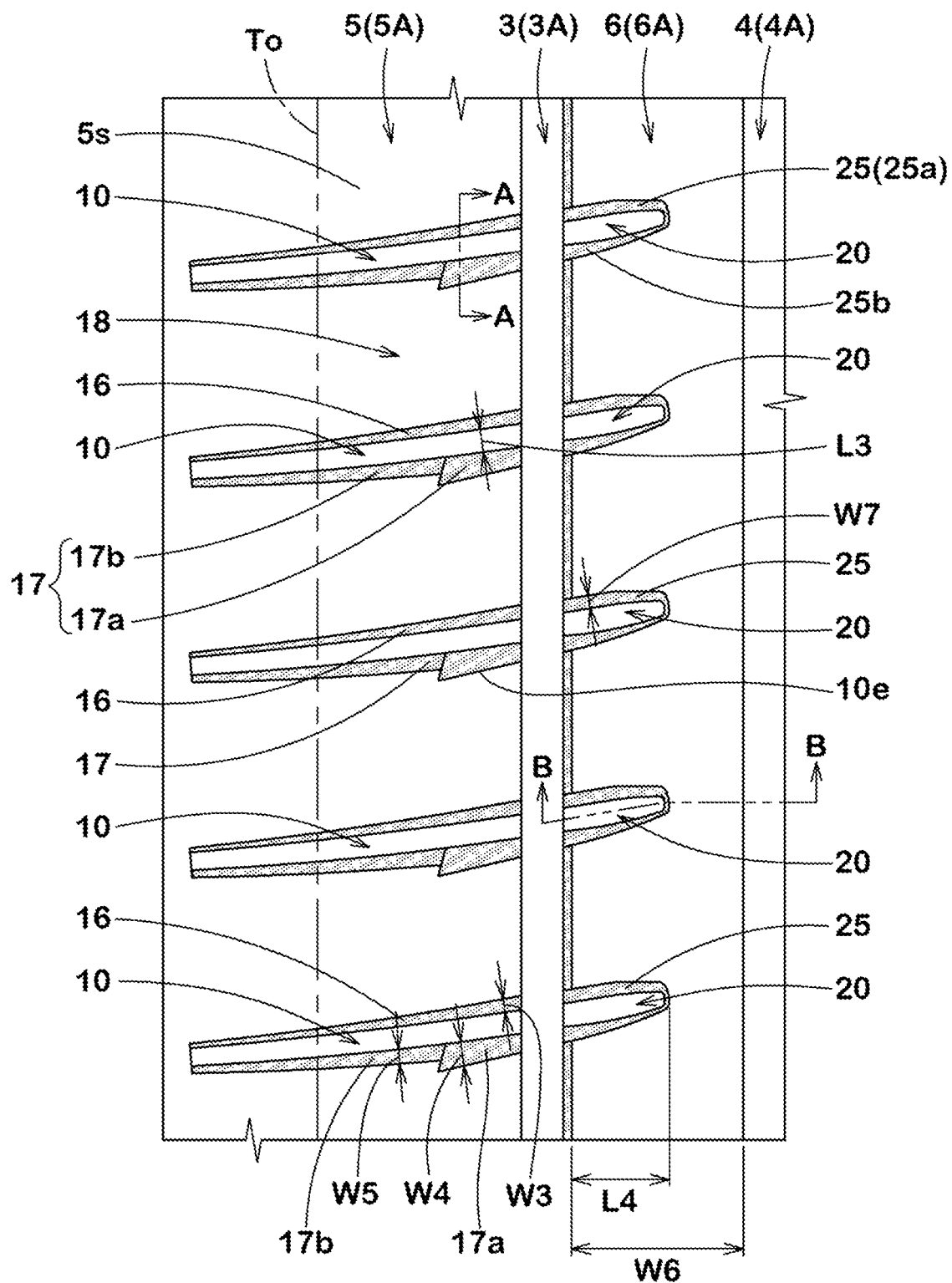
FIG. 2 is an enlarged view of an outer shoulder land portion and an outer middle land portion in FIG. 1.

FIG. 2 shows an enlarged view of the outer shoulder land portion 5A and the outer middle land portion 6A as a diagram showing an example of the shoulder land portion 5 and the middle land portion 6. As shown in FIG. 2, the shoulder land portion 5 has a plurality of shoulder lateral grooves 10 that fully traverse the shoulder land portion 5.

Each shoulder lateral groove 10 is, for example, provided at an angle less than 30° relative to the tire axial direction. In a preferable mode, the angle of the shoulder lateral groove 10 relative to the tire axial direction is, for example, 0 to 10°.

Figure 3:
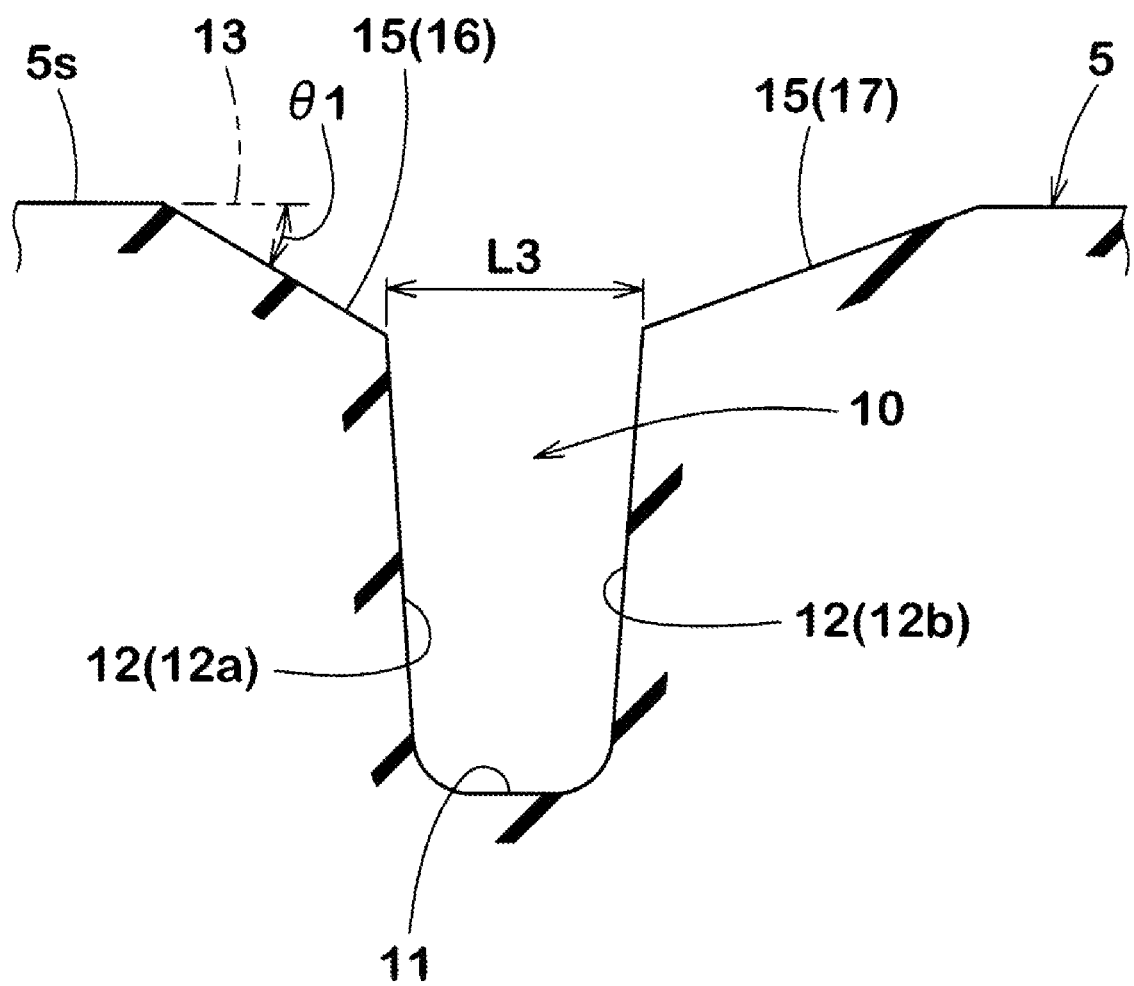
FIG. 3 is a cross-sectional view taken along a line A-A in FIG. 2.

FIG. 3 shows a cross-sectional view of the shoulder lateral groove 10 taken along a line A-A in FIG. 2. As shown in FIG. 3, the shoulder lateral groove 10 includes, in a transverse cross-section orthogonal to the longitudinal direction of the shoulder lateral groove 10, a bottom portion 11, a groove wall main body 12 extending from the bottom portion 11 outward in the tire radial direction, and a chamfered portion 15 between a ground-contact surface 5s of the shoulder land portion 5 and the groove wall main body 12. In FIG. 2, the chamfered portion 15 is colored for easy understanding of the invention.

The chamfered portion 15 is tilted at an angle θ1 of 5 to 30° relative to a tread profile 13 obtained by extending the ground-contact surface 5s. The tread profile 13 is obtained by extending the ground-contact surface 5s in the normal state such that the curvature of the ground-contact surface 5s is maintained.

Figure 4:
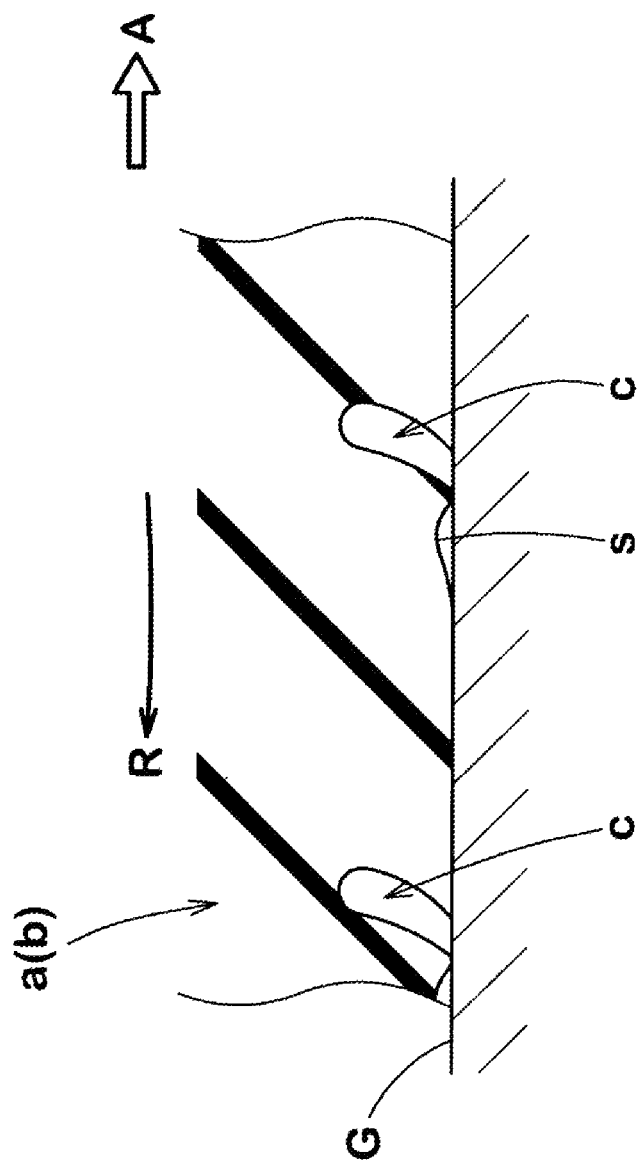
FIG. 4 is a cross-sectional view of lateral grooves having no chamfered portion during braking on a dry road surface.

FIG. 4 is a cross-sectional view of lateral grooves having no chamfered portion during braking on a dry road surface. FIG. 4 shows a state where a tire a is advancing in a direction A while rotating in a direction R. As shown in FIG. 4, during braking on a dry road surface G, lateral grooves c provided on a land portion b of the tire a deform such that the groove widths thereof are reduced, so that there is a tendency that a ground-contact surface s connected to the edge of each of the grooves locally rises from the road surface G.

As shown in FIG. 3, during braking on a dry road surface, the shoulder lateral groove 10 of the present invention can prevent the ground-contact surface 5s of the shoulder land portion 5 from rising from the road surface while the groove wall is moderately deforming to bring the outer surface of the chamfered portion 15 into contact with the road surface, and further provides high grip performance. In addition, the chamfered portion 15 can increase the opening area of the shoulder lateral groove 10 to enhance wet performance.

The shoulder lateral groove 10 includes a first groove wall main body 12a at one side in the tire circumferential direction, and a second groove wall main body 12b at the other side in the tire circumferential direction. In addition, the chamfered portion 15 includes a first chamfered portion 16 connected to the first groove wall main body 12a, and a second chamfered portion 17 connected to the second groove wall main body 12b.

Figure 5:
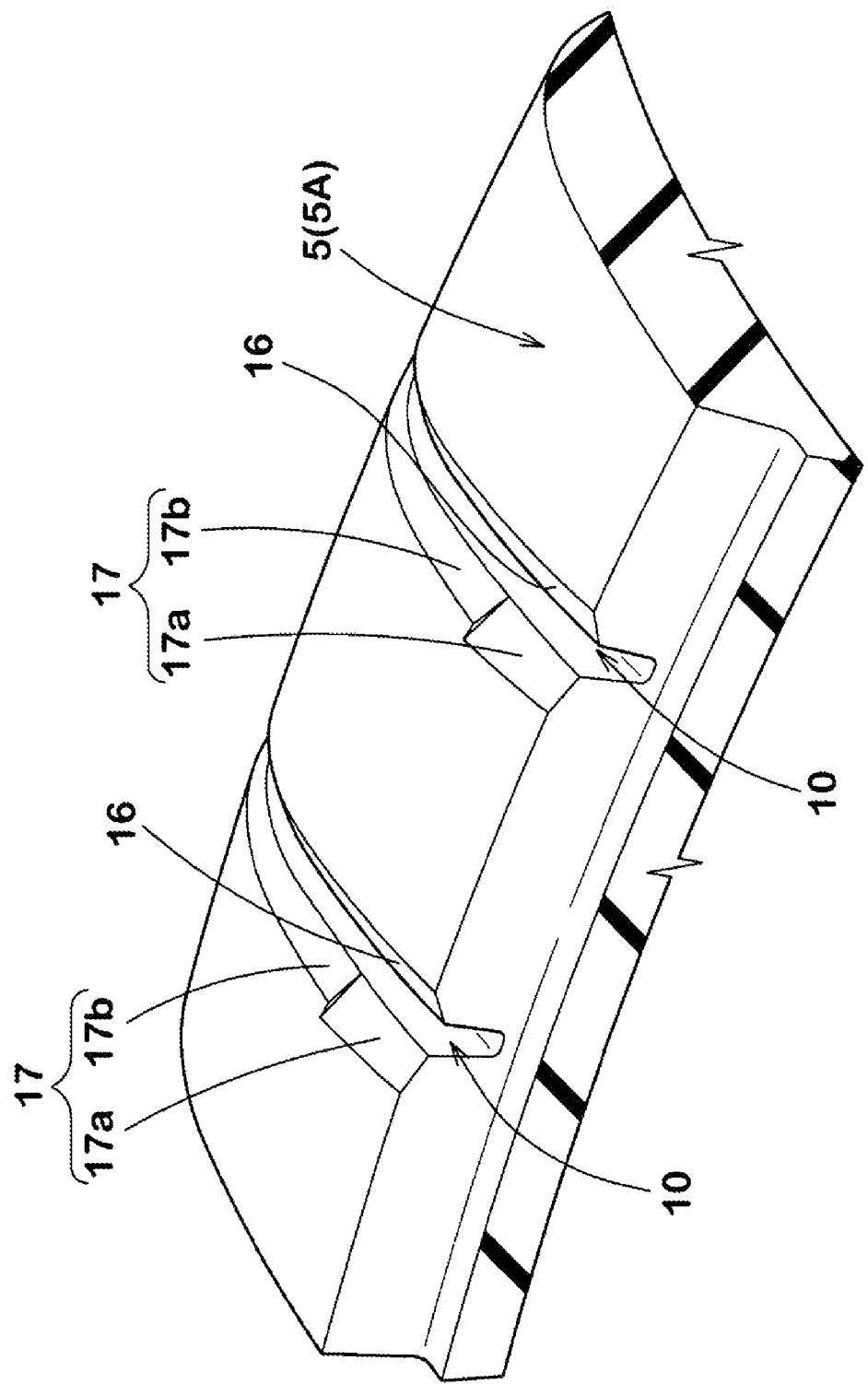
FIG. 5 is a perspective view of shoulder lateral grooves.

FIG. 5 shows a perspective view of the shoulder lateral grooves 10. As shown in FIG. 5, for example, each first chamfered portion 16 extends in the tire axial direction at a certain angle relative to the tread profile. Accordingly, the above-described advantageous effect can be expected over the entirety of the shoulder lateral groove 10.

As shown in FIG. 2, a width W3 of the first chamfered portion 16 in a direction orthogonal to the longitudinal direction of the first chamfered portion 16 preferably gradually decreases toward the outer side in the tire axial direction. Accordingly, occurrence of local wear around the groove edge of the shoulder lateral groove 10 can be inhibited.

As shown in FIG. 5, for example, each second chamfered portion 17 has a first portion 17a and a second portion 17b that have different angles relative to the tread profile. Such a second chamfered portion 17 can make striking sound become white noise when the shoulder lateral groove 10 comes into contact with the ground.

The first portion 17a is, for example, provided at the shoulder main groove 3 side with respect to the second portion 17b. For example, the first portion 17a of the present embodiment is in contact with the shoulder main groove 3.

The angle of the first portion 17a relative to the tread profile is, for example, 15 to 25°. In a more preferable mode, the angle of the first portion 17a is smaller than the angle of the first chamfered portion 16 relative to the tread profile. During running on a wet road, such a first portion 17a allows water to more smoothly enter and exit a portion where the shoulder main groove 3 and the shoulder lateral groove 10 communicate with each other, thereby enhancing wet performance.

As shown in FIG. 2, a width W4 of the first portion 17a in a direction orthogonal to the longitudinal direction of the first portion 17a preferably gradually decreases toward the inner side in the tire axial direction.

The second portion 17b is provided outward of the first portion 17a in the tire axial direction. For example, the second portion 17b of the present embodiment extends from the first portion 17a to the outer tread edge To.

The angle of the second portion 17b relative to the tread profile is, for example, preferably larger than the angle of the first portion 17a relative to the tread profile. In a further preferable mode, the angle of the second portion 17b is equal to the angle of the first chamfered portion 16 relative to the tread profile. Such a second portion 17b can make striking sound become white noise when the shoulder lateral groove 10 comes into contact with the ground, while inhibiting local wear around the groove edge of the shoulder lateral groove 10.

A width W5 of the second portion 17b in a direction orthogonal to the longitudinal direction of the second portion 17b preferably gradually decreases toward the outer side in the tire axial direction.

Since the above-described first portion 17a and second portion 17b are formed, a groove edge 10e at which the second chamfered portion 17 of the shoulder lateral groove 10 and the ground-contact surface 5s of the shoulder land portion 5 are connected to each other includes a bent portion having a Z shape. Such a groove edge 10e can also enhance grip performance in the tire axial direction to improve turning performance on a wet road surface.

In a tread plan view, the maximum width of the chamfered portion 15 is preferably 0.50 to 1.70 times a maximum distance L3 between a pair of the groove wall main bodies 12. Such a chamfered portion 15 can enhance braking performance on a dry road surface and wet performance in a well-balanced manner. As shown in FIG. 3, the distance L3 is, for example, measured at the outer ends in the tire radial direction of the groove wall main bodies 12.

As shown in FIG. 2, the shoulder land portion 5 includes a plurality of shoulder blocks 18 demarcated by the plurality of shoulder lateral grooves 10. Each of the plurality of shoulder blocks 18 preferably has no groove and no sipe on a tread surface thereof. Such shoulder blocks 18 have high stiffness and serve to exhibit excellent steering stability. In the present specification, the term "sipe" means a slit having a width less than 1.0 mm.

The middle land portion 6 is adjacent to the inner side in the tire axial direction of the shoulder land portion 5 through the shoulder main groove 3. The middle land portion 6 has a plurality of middle lateral grooves 20 extending from the shoulder main groove 3.

For example, each middle lateral groove 20 extends from the shoulder main groove 3 and terminates within the middle land portion 6. A length L4 in the tire axial direction of the middle lateral groove 20 is, for example, preferably 0.50 to 0.70 times of a width W6 in the tire axial direction of the middle land portion 6.

The middle lateral groove 20 is, for example, provided at an angle less than 30° relative to the tire axial direction. In a preferable mode, the angle of the middle lateral groove 20 relative to the tire axial direction is, for example, 0 to 10°.

At least one of the middle lateral grooves 20 is continuous with the shoulder lateral groove 10 through the shoulder main groove 3. In the present embodiment, each middle lateral groove 20 is continuous with the shoulder lateral groove 10 through the shoulder main groove 3. Such a middle lateral groove 20, together with the shoulder lateral groove 10, serve to enhance wet performance. The above configuration includes a mode in which at least a region obtained by virtually extending the shoulder lateral groove 10 toward the tire equator C side along the longitudinal direction of the shoulder lateral groove 10 overlaps a part of an end portion at the shoulder main groove 3 side of the middle lateral groove 20. In a preferable mode, the overlapping width of the region and the end portion of the middle lateral groove is not less than 70% of the groove width of the middle lateral groove.

Similar to each shoulder lateral groove 10, each middle lateral groove 20 includes a chamfered portion 25. That is, each middle lateral groove 20 includes, in a transverse cross-section orthogonal to the longitudinal direction of the middle lateral groove 20, a bottom portion, a groove wall main body extending from the bottom portion outward in the tire radial direction, and a chamfered portion 25 between a ground-contact surface of the middle land portion 6 and the groove wall main body. The chamfered portion 25 of the middle lateral groove 20 is preferably tilted at an angle of 5 to 30° relative to a tread profile obtained by extending the ground-contact surface of the middle land portion 6. Such a middle lateral groove 20 achieves the same advantageous effect as the above-described shoulder lateral groove 10.

In the present embodiment, a chamfered portion 25a connected to a groove edge at one side in the tire circumferential direction of the middle lateral groove 20 and a chamfered portion 25b connected to a groove edge at the other side in the tire circumferential direction of the middle lateral groove 20 have the same angle relative to the tread profile.

Larger contact pressure tends to act on the middle lateral groove 20 than on the shoulder lateral groove 10. Thus, the angle of the chamfered portion 25 of the middle lateral groove 20 relative to the tread profile is preferably smaller than the maximum angle of the chamfered portion 15 of the shoulder lateral groove 10 relative to the tread profile. The angle of the chamfered portion 25 of the middle lateral groove 20 is, for example, preferably smaller than the angle of the first chamfered portion 16 of the shoulder lateral groove 10 relative to the tread profile. In the present embodiment, the angle of the chamfered portion 25 of the middle lateral groove 20 is equal to the angle of the first portion 17a of the second chamfered portion 17 of the shoulder lateral groove 10 relative to the tread profile. Accordingly, uneven wear around the middle lateral groove 20 and the shoulder lateral groove 10 is inhibited.

Specifically, the angle of the chamfered portion 25 of the middle lateral groove 20 is preferably 15 to 25°.

A width W7 of the chamfered portion 25 of the middle lateral groove 20 in a direction orthogonal to the longitudinal direction of the middle lateral groove 20 preferably gradually decreases toward the inner side in the tire axial direction.

Figure 6:
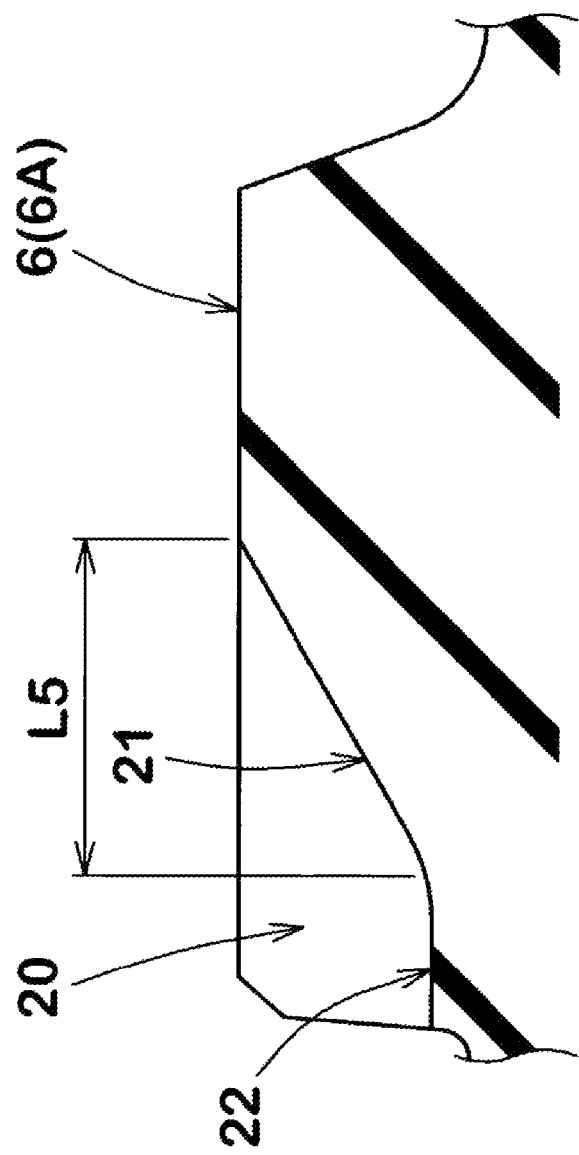
FIG. 6 is a cross-sectional view taken along a line B-B in FIG. 2.

FIG. 6 shows a cross-sectional view of the middle lateral groove 20 taken along a line B-B in FIG. 2. As shown in FIG. 6, the middle lateral groove 20 has a gradually increasing portion 21 having a depth that gradually increases toward the outer side in the tire axial direction, and an outer portion 22 that is provided outward of the gradually increasing portion 21 in the tire axial direction and that has a constant depth. The gradually increasing portion 21 prevents a portion from being suddenly changed in stiffness in the outer middle land portion 6A.

In order to further exhibit the above-described advantageous effects, a length L5 in the tire axial direction of the gradually increasing portion 21 is preferably 0.35 to 0.45 times the width W6 (shown in FIG. 2) in the tire axial direction of the middle land portion 6.

The middle land portion 6 is formed as a rib continuously extending in the tire circumferential direction. The middle land portion 6 has no groove and no sipe except for the middle lateral grooves 20. Such a middle land portion 6 has high stiffness and serves to enhance steering stability.

Figure 7:
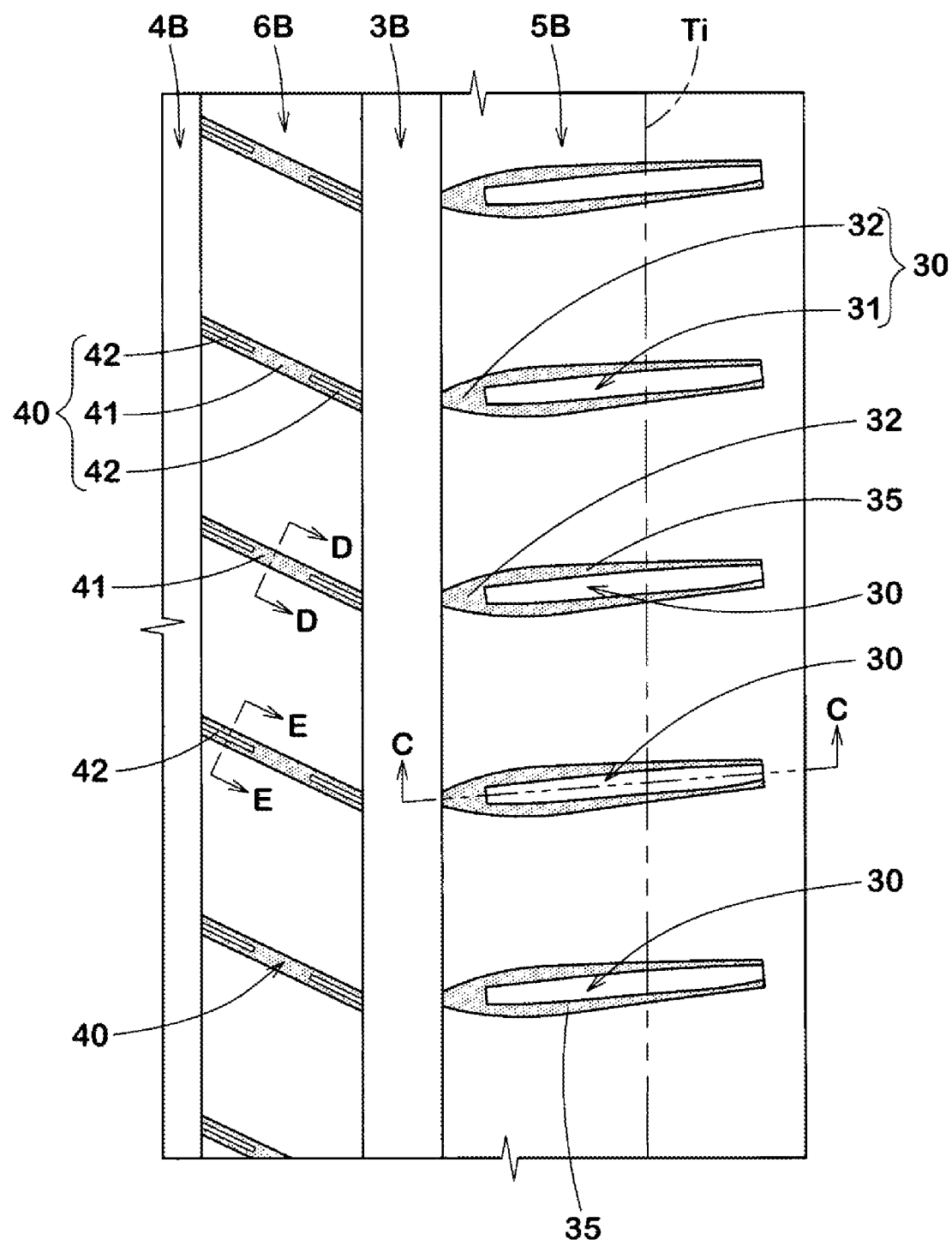
FIG. 7 is an enlarged view of an inner shoulder land portion and an inner middle land portion in FIG. 1.

FIG. 7 shows an enlarged view of the inner shoulder land portion 5B and the inner middle land portion 6B. As shown in FIG. 7, the inner shoulder land portion 5B has a plurality of inner shoulder lateral grooves 30. For example, each inner shoulder lateral groove 30 includes a chamfered portion 35 similar to the chamfered portion 15 of the shoulder lateral groove 10. Thus, the above-described structure of the chamfered portion 15 of the shoulder lateral groove 10 can be applied to the chamfered portion 35 of the inner shoulder lateral groove 30. In FIG. 7, each chamfered portion 35 and portions recessed from the ground-contact surface of the land portion are colored for easy understanding of the invention.

The inner shoulder lateral groove 30 includes, for example, a groove main body portion 31 and a shallow ground-contact portion 32 connected to the inner side in the tire axial direction of the groove main body portion 31. The groove main body portion 31 extends from the inner tread edge Ti inward in the tire axial direction. The shallow ground-contact portion 32 does not come into contact with a flat surface in a state where the normal load is applied to the tire 1 in the normal state and the tire 1 is brought into contact with the flat surface at a camber angle of 0 degrees, and comes into contact with the flat surface when a load larger than the normal load is applied to the tire 1. In addition, the shallow ground-contact portion 32 is smoothly continuous with the chamfered portion 35.

Figure 8:
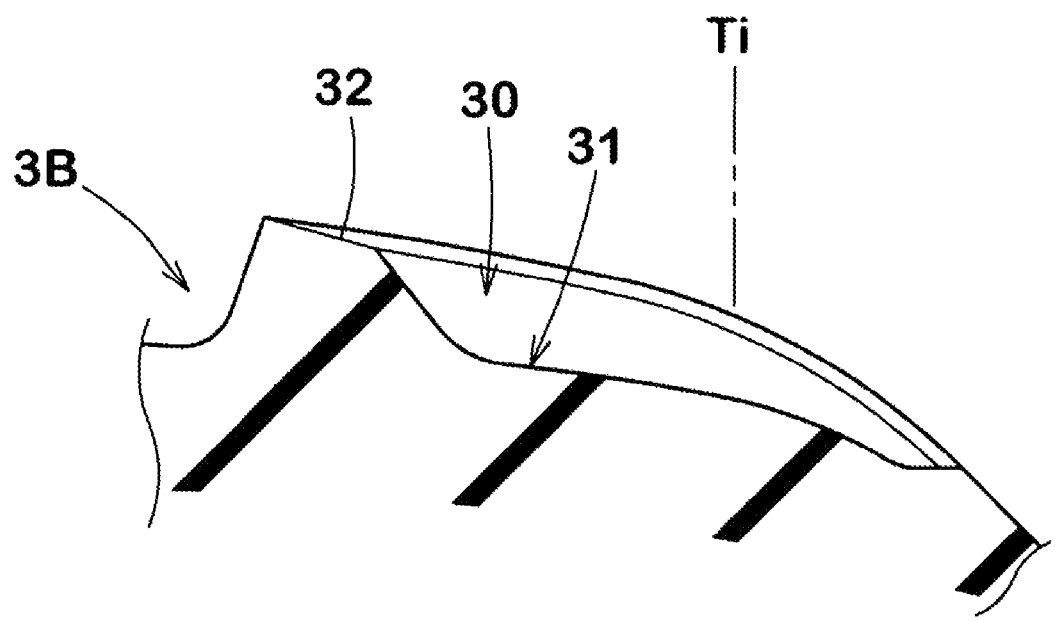
FIG. 8 is a cross-sectional view taken along a line C-C in FIG. 7.

FIG. 8 shows a cross-sectional view of the inner shoulder lateral groove 30 taken along a line C-C in FIG. 7. As shown in FIG. 8, the maximum depth of the groove main body portion 31 is, for example, about 0.50 to 1.00 times the depth of the main groove. For example, the shallow ground-contact portion 32 has a maximum depth of 0.5 to 2.0 mm and extends from the groove main body portion 31 to the inner shoulder main groove 3B. In addition, for example, the depth of the shallow ground-contact portion 32 preferably gradually decreases from the groove main body portion 31 toward the shoulder main groove 3. Such a shallow ground-contact portion 32 inhibits rising of the ground-contact surface around the inner shoulder lateral groove 30 and enhances braking performance on a dry road surface.

The shallow ground-contact portion 32 may further have a slit that extends from the groove main body portion 31 to the shoulder main groove 3 and that has a width and a depth less than 0.5 mm (not shown).

As shown in FIG. 7, the inner shoulder land portion 5B preferably has no groove and no sipe except for the above-described inner shoulder lateral grooves 30. Such an inner shoulder land portion 5B has high stiffness and serves to exhibit excellent steering stability.

The inner middle land portion 6B has, for example, a plurality of inner middle lateral grooves 40. For example, each inner middle lateral groove 40 extends from the inner crown main groove 4B to the inner shoulder main groove 3B. The inner middle lateral groove 40 is, for example, tilted relative to the tire axial direction in the direction opposite to that of the inner shoulder lateral groove 30. The angle of the inner middle lateral groove 40 relative to the tire axial direction is, for example, preferably less than 45°. In a more preferable mode, the angle of the inner middle lateral groove 40 is, for example, 15 to 30°.

The inner middle lateral groove 40 includes, for example, a center portion 41 in the tire axial direction, and a pair of end portions 42 provided at both sides of the center portion 41. Each end portion 42 extends from the center portion 41 to the inner crown main groove 4B or the inner shoulder main groove 3B.

Figure 9A:
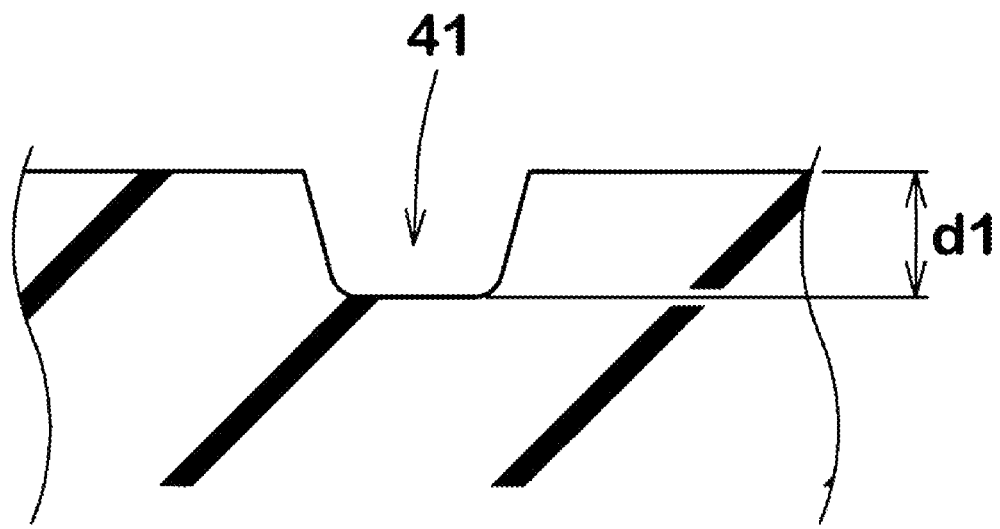
FIG. 9A is a cross-sectional view taken along a line D-D in FIG. 7.

FIG. 9A shows a cross-sectional view of the center portion 41 taken along a line D-D in FIG. 7. As shown in FIG. 9A, the center portion 41 has, for example, a depth d1 smaller than that of the shoulder lateral groove 10. The depth d1 of the center portion 41 is, for example, preferably 1.0 to 2.0 mm Such a center portion 41 ensures appropriate wet performance while maintaining high steering stability.

Figure 9B:
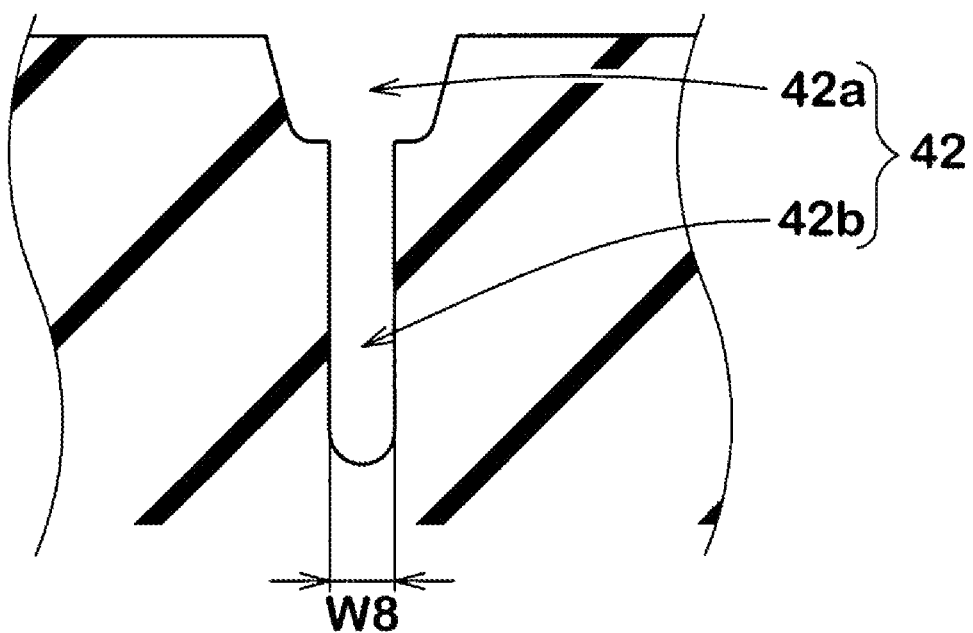
FIG. 9B is a cross-sectional view taken along a line E-E in FIG. 7.

FIG. 9B shows a cross-sectional view of the end portion 42 taken along a line E-E in FIG. 7. As shown in FIG. 9B, the end portion 42 has, for example, a shallow bottom portion 42a that has the same width and depth as the center portion 41, and a narrow portion 42b that has a width W8 smaller than that of the shallow bottom portion 42a and that extends from the shallow bottom portion 42a inward in the tire radial direction. The width W8 of the narrow portion 42b is, for example, less than 1.5 mm and more preferably 0.4 to 0.8 mm.

As shown in FIG. 7, the inner middle land portion 6B preferably has no groove and sipe except for the inner middle lateral grooves 40.

Figure 10:
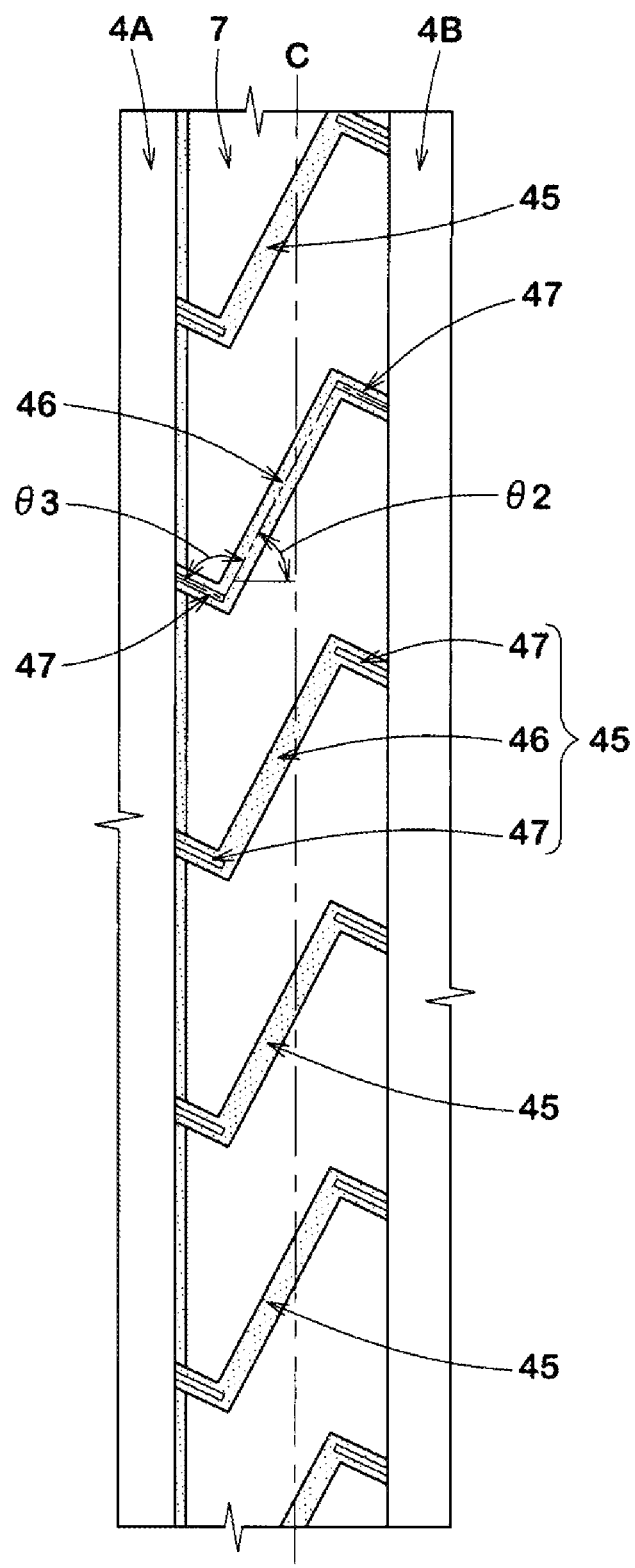
FIG. 10 is an enlarged view of a crown land portion.

FIG. 10 shows an enlarged view of the crown land portion 7. As shown in FIG. 10, the crown land portion 7 has a plurality of crown lateral grooves 45. Each crown lateral groove 45 includes, for example, a center tilt portion 46 and a pair of end tilt portions 47.

The center tilt portion 46 is, for example, tilted relative to the tire axial direction in the same direction as that of the shoulder lateral groove 10. An angle θ2 of the center tilt portion 46 relative to the tire axial direction is, for example, preferably larger than the angle of the shoulder lateral groove 10 relative to the tire axial direction and more preferably larger than 45°. Specifically, the angle θ2 of the center tilt portion 46 is preferably 60 to 70°. Such a center tilt portion 46 serves to also provide grip performance in the tire axial direction to enhance turning performance.

The center tilt portion 46 has, for example, a cross-sectional shape that is the same as that of the center portion 41 of the inner middle lateral groove 40. Thus, the structure regarding the cross-section of the center portion 41 of the inner middle lateral groove 40 can be applied to the center tilt portion 46.

Each end tilt portion 47 extends, for example, from the center tilt portion 46 to the outer crown main groove 4A or the inner crown main groove 4B. The end tilt portion 47 is tilted relative to the tire axial direction in the direction opposite to that of the center tilt portion 46. An angle θ3 between the center tilt portion 46 and the end tilt portion 47 is, for example, preferably 80 to 100°.

The end tilt portion 47 has, for example, a cross-sectional shape that is the same as that of the end portion 42 of the inner middle lateral groove 40. Thus, the structure regarding the cross-section of the end portion 42 of the inner middle lateral groove 40 can be applied to the end tilt portion 47.

As shown in FIG. 10, for example, the end tilt portion 47 of the crown lateral groove 45 preferably overlaps a region obtained by virtually extending the end portion of the inner middle lateral groove 40 in the tire axial direction. Accordingly, the crown lateral groove 45 and the narrow portion 42b of the inner middle lateral groove 40 easily become open, and wet performance is enhanced.

Although the tire according to the embodiment of the present invention has been described in detail above, the present invention is not limited to the above specific embodiment, and various modifications can be made to implement the present invention.

EXAMPLES

Figure 11:
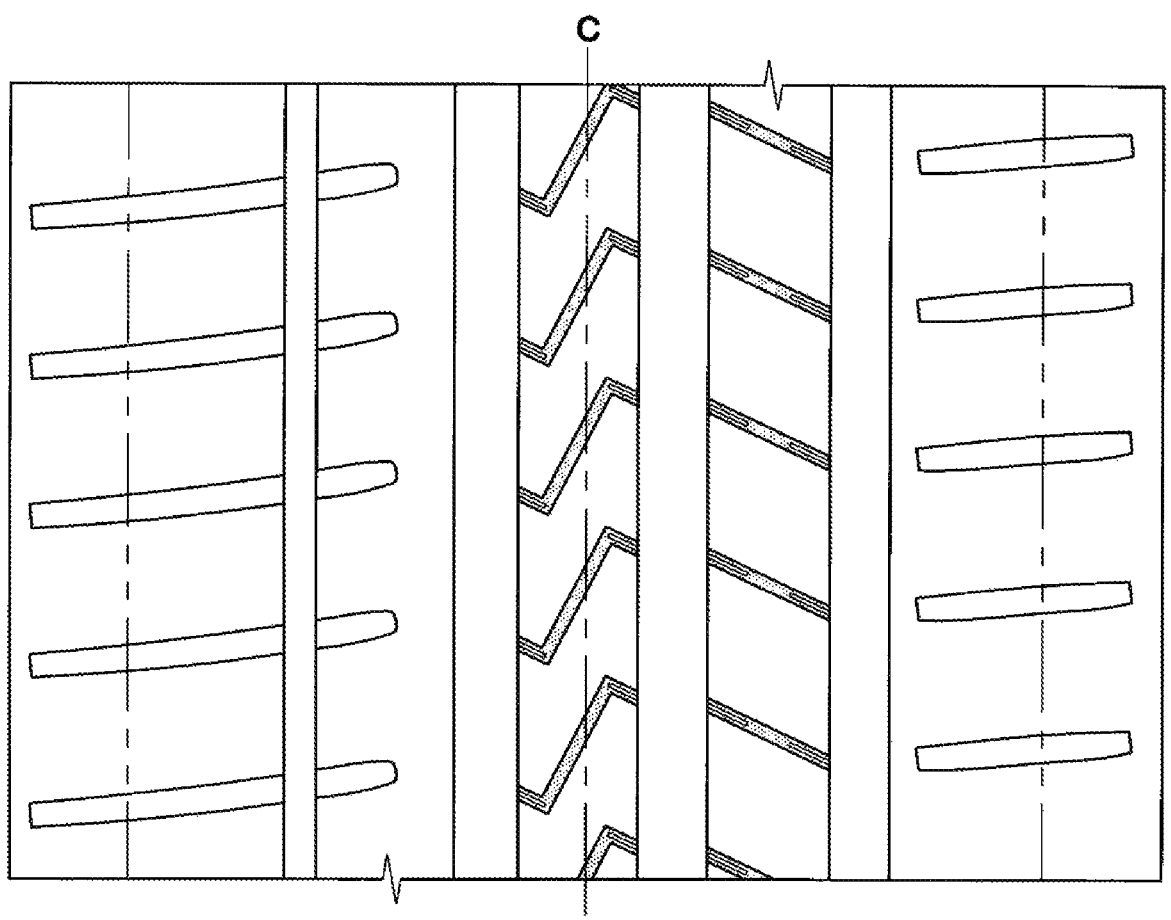
FIG. 11 is a development of a tread portion of a tire of a comparative example.

Pneumatic tires with a size of 225/45R17 having the basic tread pattern in FIG. 1 were produced as test tires on the basis of specifications in Table 1. As a comparative example, a tire in which each shoulder lateral groove is not provided with a chamfered portion as shown in FIG. 11 was produced as a test tire. The pattern of the tire of the comparative example is substantially the same as shown in FIG. 1, except that no chamfered portion is provided. Each test tire was tested for braking performance on a dry road surface and wet performance. The common specifications and the test methods for all the test tires are as follows.

Rim: 17×7.5 J

Tire internal pressure: 230 kPa

Test vehicle: a front-wheel-drive car having an engine displacement of 1400 cc

Tire mounted position: all wheels

<Braking Performance on Dry Road Surface>

Using the above test vehicle, sensory evaluation was made by a driver for braking performance on a dry road surface. The results are indicated as scores with the score of the comparative example being 100. The greater the value is, the better the braking performance on the dry road surface is.

<Wet Performance>

Sensory evaluation was made by a driver for running performance when the driver drove the above test vehicle on a wet road surface. The results are indicated as scores with the score of the comparative example being 100. The greater the value is, the better the wet performance is.

The test results are shown in Table 1.

TABLE 1

| | Comparative Example FIG. 11 | Example 1 FIG. 1 | Example 2 FIG. 1 | Example 3 FIG. 1 | Example 4 FIG. 1 | Example 5 FIG. 1 | Example 6 FIG. 1 | Example 7 FIG. 1 | Example 8 FIG. 1 | Example 9 FIG. 1 |
|---|---|---|---|---|---|---|---|---|---|---|
| Angle of first chamfered portion (°) | — | 30 | 15 | 20 | 25 | 30 | 30 | 30 | 30 | 30 |
| Angle of first portion of second chamfered portion (°) | — | 20 | 5 | 10 | 15 | 25 | 20 | 20 | 20 | 20 |
| Angle of second portion of second chamfered portion (°) | — | 30 | 15 | 20 | 25 | 30 | 30 | 30 | 30 | 30 |
| Maximum width of chamfered portion/maximum distance L3 between groove wall main bodies | — | 1.30 | 1.30 | 1.30 | 1.30 | 1.30 | 0.50 | 0.90 | 1.50 | 1.70 |
| Braking performance on dry road surface (score) | 100 | 105 | 104 | 105 | 105 | 103 | 104 | 105 | 105 | 104 |
| Wet performance (score) | 100 | 106 | 105 | 105 | 106 | 104 | 104 | 105 | 106 | 106 |

As a result of the tests, it can be confirmed that the tires of the examples have improved braking performance on a dry road surface and improved wet performance.

What is claimed is:

1. A tire comprising a tread portion, wherein
the tread portion includes a shoulder land portion disposed at an endmost tread edge side, and a shoulder main groove continuously extending in the tire circumferential direction at an outer tread edge side or an inner tread edge side,
the shoulder land portion has a plurality of shoulder lateral grooves that fully traverse the shoulder land portion,
each of the shoulder lateral grooves includes, in a transverse cross-section orthogonal to a longitudinal direction of the shoulder lateral groove, a bottom portion, a groove wall main body extending from the bottom portion outward in a tire radial direction, and a chamfered portion between a ground-contact surface of the shoulder land portion and the groove wall main body,
the chamfered portion is tilted at an angle of 5 to 30° relative to a tread profile obtained by extending the ground-contact surface,
each of the shoulder lateral grooves includes a first groove wall main body at one side in a tire circumferential direction, and a second groove wall main body at another side in the tire circumferential direction,
the chamfered portion includes a first chamfered portion connected to the first groove wall main body, and a second chamfered portion connected to the second groove wall main body,
the first chamfered portion extends in a tire axial direction at a constant angle relative to the tread profile,
the second chamfered portion has a first portion and a second portion that have different angles relative to the tread profile, the angle of the second portion being larger than the angle of the first portion, and
the first chamfered portion and the first portion of the second chamfered portion communicate with the shoulder main groove.

2. The tire according to claim 1, wherein
the shoulder land portion includes a plurality of shoulder blocks demarcated by the plurality of shoulder lateral grooves, and
each of the plurality of shoulder blocks has no groove and sipe on a tread surface thereof.

3. The tire according to claim 1, wherein the second portion is provided outward of the first portion in the tire axial direction.

4. The tire according to claim 1, wherein the angle of the first portion is 15 to 25°.

5. The tire according to claim 1, wherein a groove edge at which the second chamfered portion of the shoulder lateral groove and the ground-contact surface are connected to each other includes a bent portion having a Z shape.

6. The tire according to claim 1, wherein
each of the shoulder lateral grooves has a pair of the groove wall main bodies that face each other, and
in a tread plan view, a maximum width of the chamfered portion is 0.50 to 1.70 times a maximum distance between the pair of the groove wall main bodies.

7. The tire according to claim 1, wherein
the tread portion has a crown main groove continuously extending in the tire circumferential direction at a tire equator side.

8. The tire according to claim 7, wherein
the tread portion includes a middle land portion adjacent to an inner side in a tire axial direction of the shoulder land portion through the shoulder main groove,
the middle land portion has a plurality of middle lateral grooves that extend from the shoulder main groove, and
at least one of the middle lateral grooves is continuous with the shoulder lateral groove through the shoulder main groove.

9. The tire according to claim 8, wherein
each of the middle lateral grooves includes, in a transverse cross-section orthogonal to a longitudinal direction of the middle lateral groove, a bottom portion, a groove wall main body extending from the bottom portion outward in the tire radial direction, and a chamfered portion between a ground-contact surface of the middle land portion and the groove wall main body, and
the chamfered portion of each of the middle lateral grooves is tilted at an angle of 5 to 30° relative to a tread profile obtained by extending the ground-contact surface of the middle land portion.

10. The tire according to claim 9, wherein the angle of each of the middle lateral grooves is smaller than the maximum angle of the shoulder lateral groove.

11. The tire according to claim 8, wherein
each middle lateral groove extends from the shoulder main groove and terminates within the middle land portion.

12. The tire according to claim 11, wherein
a length in the tire axial direction of the middle lateral groove is 0.50 to 0.70 times of a width in the tire axial direction of the middle land portion.

13. The tire according to claim 7, wherein
a distance L1 in the tire axial direction from the tire equator to the groove center line of the shoulder main groove is 0.25 to 0.35 times a tread width.

14. The tire according to claim 7, wherein
the groove width of the shoulder main groove is 4.0% to 8.0% of the tread width.

15. The tire according to claim 7, wherein
the shoulder main groove has a smaller groove width than the crown main groove.

16. The tire according to claim 1, wherein
each shoulder lateral groove is provided at an angle θ to 10° relative to the tire axial direction.

17. The tire according to claim 1, wherein
a width of the first chamfered portion in a direction orthogonal to the longitudinal direction of the first chamfered portion gradually decreases toward the outer side in the tire axial direction.

18. A tire comprising a tread portion, wherein
the tread portion includes a shoulder land portion disposed at an endmost tread edge side, and a shoulder main groove continuously extending in the tire circumferential direction at an outer tread edge side or an inner tread edge side,
the shoulder land portion has a plurality of shoulder lateral grooves that fully traverse the shoulder land portion,
each of the shoulder lateral grooves includes, in a transverse cross-section orthogonal to a longitudinal direction of the shoulder lateral groove, a bottom portion, a groove wall main body extending from the bottom portion outward in a tire radial direction, and a chamfered portion between a ground-contact surface of the shoulder land portion and the groove wall main body,
the chamfered portion is tilted at an angle of 5 to 30° relative to a tread profile obtained by extending the ground-contact surface,
each of the shoulder lateral grooves includes a first groove wall main body at one side in a tire circumferential direction, and a second groove wall main body at another side in the tire circumferential direction,
the chamfered portion includes a first chamfered portion connected to the first groove wall main body, and a second chamfered portion connected to the second groove wall main body,
the first chamfered portion extends in a tire axial direction at a constant angle relative to the tread profile,
the second chamfered portion has a first portion and a second portion that have different angles relative to the tread profile, the angle of the second portion being larger than the angle of the first portion,
the first chamfered portion and the first portion of the second chamfered portion communicate with the shoulder main groove,
a width of the first portion in a direction orthogonal to the longitudinal direction of the first portion gradually decreases toward the inner side in the tire axial direction,
a width of the second portion in a direction orthogonal to the longitudinal direction of the second portion gradually decreases toward the outer side in the tire axial direction, and
a groove edge at which the second chamfered portion of the shoulder lateral groove and the ground-contact surface are connected to each other includes a bent portion having a Z shape.

19. A tire comprising a tread portion, wherein
the tread portion includes a shoulder land portion disposed at an endmost tread edge side, and a shoulder main groove continuously extending in the tire circumferential direction at an outer tread edge side or an inner tread edge side,
the shoulder land portion has a plurality of shoulder lateral grooves that fully traverse the shoulder land portion,
each of the shoulder lateral grooves includes, in a transverse cross-section orthogonal to a longitudinal direction of the shoulder lateral groove, a bottom portion, a groove wall main body extending from the bottom portion outward in a tire radial direction, and a chamfered portion between a ground-contact surface of the shoulder land portion and the groove wall main body,
the chamfered portion is tilted at an angle of 5 to 30° relative to a tread profile obtained by extending the ground-contact surface,
each of the shoulder lateral grooves includes a first groove wall main body at one side in a tire circumferential direction, and a second groove wall main body at another side in the tire circumferential direction,
the chamfered portion includes a first chamfered portion connected to the first groove wall main body, and a second chamfered portion connected to the second groove wall main body,
the first chamfered portion extends in a tire axial direction at a constant angle relative to the tread profile,
the second chamfered portion has a first portion and a second portion that have different angles relative to the tread profile, the angle of the second portion being larger than the angle of the first portion, and
the first chamfered portion and the first portion of the second chamfered portion communicate with the shoulder main groove,
the tread portion includes a middle land portion adjacent to an inner side in a tire axial direction of the shoulder land portion through the shoulder main groove,
the middle land portion has a plurality of middle lateral grooves that extend from the shoulder main groove,
at least one of the middle lateral grooves is continuous with the shoulder lateral groove through the shoulder main groove,
each of the middle lateral grooves includes, in a transverse cross-section orthogonal to a longitudinal direction of the middle lateral groove, a bottom portion, a groove wall main body extending from the bottom portion outward in the tire radial direction, and a chamfered portion between a ground-contact surface of the middle land portion and the groove wall main body,
the chamfered portion of each of the middle lateral grooves is tilted at an angle of 5 to 30° relative to a tread profile obtained by extending the ground-contact surface of the middle land portion, and
the angle of each of the middle lateral grooves is smaller than the angle of the first chamfered portion of the shoulder lateral groove.

* * * * *